United States Patent [19]

Papay et al.

[11] Patent Number: 4,855,074

[45] Date of Patent: Aug. 8, 1989

[54] HOMOGENEOUS ADDITIVE CONCENTRATES AND THEIR FORMATION

[75] Inventors: Andrew G. Papay, Manchester; Joseph P. O'Brien, Kirkwood, both of Mo.

[73] Assignee: Ethyl Petroleum Additives, Inc., St. Louis, Mo.

[21] Appl. No.: 167,875

[22] Filed: Mar. 14, 1988

[51] Int. Cl.[4] ................ C10M 133/56; C10M 155/04
[52] U.S. Cl. .................... 252/51.5 A; 252/49.6; 252/49.8; 252/51.5 R; 548/546; 44/63; 44/71; 44/76
[58] Field of Search .................. 252/49.6, 51.5 A; 548/546

[56] References Cited

U.S. PATENT DOCUMENTS

| | | | |
|---|---|---|---|
| 3,087,936 | 4/1963 | LeSuer | 252/32.7 E |
| 3,202,678 | 8/1965 | Stuart et al. | 252/51.5 A |
| 3,219,666 | 11/1965 | Norman et al. | 252/51.5 A |
| 3,254,025 | 5/1966 | LeSuer | 252/49.6 |
| 3,272,746 | 9/1966 | LeSuer et al. | 252/51.5 A |
| 3,281,428 | 10/1966 | LeSuer | 252/49.6 |
| 3,306,908 | 2/1967 | LeSuer | 252/49.6 |
| 3,338,832 | 8/1967 | LeSuer | 252/47.5 |
| 3,413,227 | 11/1968 | Howard et al. | 252/51.5 A |
| 3,623,985 | 11/1971 | Hendrickson | 548/546 |
| 3,788,993 | 1/1974 | Andress | 252/51.5 A |
| 3,923,672 | 12/1975 | Durr et al. | 252/51.5 A |
| 3,950,341 | 4/1976 | Okamoto et al. | 548/546 |
| 3,991,056 | 11/1976 | Okamoto et al. | 548/546 |
| 4,212,754 | 7/1980 | Chibnik | 252/49.7 |
| 4,256,595 | 3/1981 | Sung et al. | 252/51.5 A |
| 4,263,015 | 4/1981 | Sung et al. | 252/51.5 A |
| 4,388,201 | 6/1983 | Brownawell et al. | 252/49.6 |

Primary Examiner—William R. Dixon, Jr.
Assistant Examiner—Ellen M. McAvoy
Attorney, Agent, or Firm—David M. Bunnell; John F. Sieberth

[57] ABSTRACT

A homogeneous concentrate suitable for use as an additive for lubricating oils is formed from a long chain succinimide and a benzotriazole by heating a mixture of these materials in the presence of water or alkoxylated amines or dihydrocarbylphosphites or dihydrocarbyl phosphonates (or mixtures of such materials) and then distilling the volatile component, from the resulting product. When this heating step is conducted in the additional presence of a boronating agent such as boric acid and the volatile component, is removed by distillation, not only is a compatible additive concentrate formed, but the long chain succinimide is boronated in the process.

39 Claims, No Drawings

HOMOGENEOUS ADDITIVE CONCENTRATES AND THEIR FORMATION

TECHNICAL FIELD

This invention relates to the production of homogeneous lubricant and fuel additive compositions from a long chain succinimide and a benzotriazole with or without other additives.

BACKGROUND

Long chain succinimides are known to be useful as additives for various lubricating oil compositions. Triazoles such as benzotriazole and alkyl-substituted benzotriazoles are also known to be useful as lubricant additives.

There are instances where it is desired to use long chain succinimides and benzotriazoles in combination with each other in the form of an additive concentrate or formulation. Unfortunately these materials tend to be incompatible with each other when in the form of a concentrate.

There are also instances where it is desired to boronate a long chain succinimide and to employ the boronated succinimide product in combination with a benzotriazole in the form of an additive concentrate. Here again the formation of a compatible mixture of the concentrated products is highly desirable.

The Invention

One embodiment of this invention involves the discovery, inter alia, that a homogeneous product can be formed from a long chain succinimide and a benzotriazole. This is accomplished by heating a mixture of these materials preferably in the presence of water or an alkoxylated amine or a dihydrocarbyl phosphite or a dihydrocarbyl phosphonate (or any mixture of the foregoing) to a temperature and for a time at which a homogeneous product is formed. Normally temperatures above about 50° C., usually in the range of about 80° to about 150° C., preferably 100° to 120° C., are used although departures from these ranges are permissible. After the heating step, water, if used or formed, is distilled off from the product leaving a homogeneous concentrate suitable for use as an additive for lubricating oils. Lower boiling alcohols or other volatiles formed during the process are also distilled off in the operation.

Pursuant to another embodiment of this invention the above heating step is conducted in the additional presence of a boronating agent, preferably an ester of an oxyacid of boron, such as a borate ester, a pyroborate ester, a metaborate ester or the like; and most preferably boric acid. This not only forms a compatible additive concentrate, but the long chain succinimide is boronated in the process. Water formed when using boric acid or partial esters of oxyacids of boron in the boronation process together with any water initially added to the system is distilled off.

For best results the above mixtures should be agitated (e.g., stirred or shaken) during the heating step.

The period of time during which the mixture is heated may vary depending on the temperature and materials present in the initial mixture. Usually times in the order of a few minutes up to an hour or so will suffice. In any given situation, visual observation readily indicates when homogenation has occurred.

Since water used or formed in the process is distilled off, the amount of water that may be added to the initial mixture is not critical. A feature of this invention, however, is the fact that the amount of water used can be extremely small. Thus the amount of water distilled off in the second step can likewise be kept to a minimum and thus energy requirements for the process can be kept to a minimum. Alternatively use of alkoxylated amines with boric acid (or partial borate esters) cancels the need for added water and unless water is initially added, the water distilled at the end of the reaction is only that part formed by the boronation reaction. Mixtures of water and one or more alkoxylated amines and/or one or more dihydrocarbyl phosphites and/or one or more dihydrocarbyl phosphonates may be used. Likewise mixtures of one or more alkoxylated amines and/or one or more dihydrocarbyl phosphites and/or one or more dihydrocarbyl phosphonates may be used without added water.

The proportions of the long chain succinimide and the benzotriazole components can be varied. In most cases this mixture will predominate in the succinimide component, typically containing by weight from about 10 to about 1000 parts, and preferably from about 50 to about 100 parts, of the succinimide per part by weight of the benzotriazole component.

When using added water, the initial mixture will contain at least about 0.1 part, and preferably about 1 part, by weight of water per part by weight of the benzotriazole present in the mixture. Any additional quantity can be used, if desired, although use of more than about 2 parts by weight per each part by weight of the benzotriazole is not recommended as it would simply increase the amount of water to be distilled off after the product mixture has been heated. Frequently the amount of water present in the succinimide dispersant as an impurity from the process used for its production is enough to facilitate the solution of the benzotriazole without the need for added water.

Water and/or other volatiles used or formed in the process may be distilled off at reduced pressure if desired.

While the proportions of the various ingredients can be varied, they will generally range in parts by weight, as follows:

Long Chain Succinimide: 0.1 to 10; preferably 2.5 to 3.5

Benzotriazole: 0.01 to 0.1; preferably 0.03 to 0.05

Alkoxylated amine (optional): 0.01 to 1; preferably 0.1 to 0.2

Phosphite ester (optional): 0.1 to 1; preferably 0.1 to 0.3

Phosphonate ester (optional): 0.01 to 0.3; preferably 0.05 to 0.15

Water (optional): 0.01 to 0.1; preferably 0.01 to 0.3

Boronating agent (optional): 0.01 to 0.3; preferably 0.05 to 0.15

If desired a small amount of a diluent oil (e.g., up to about 1 part per part by weight of the succinimide component) may be included in the mixture being heated.

Particularly preferred mixtures have the following proportions on a weight basis:

Succinimide dispersant—2.5

Benzotriazole component—0.04

Water—0.03

Boric acid (optional)—0.1

Diluent oil (optional)—0.5

It will be understood and appreciated that the heating and distillation steps need not be performed separately.

Instead the mixture of the desired components can be heated while water is being distilled off. Optimum conditions for use with any given mixture of components can be readily ascertained by the simple expedient of running a few pilot experiments. It will be noted that the entire operation can be performed in the same vessel equipped with heating, stirring and distillation means. It is not necessary to employ distillation columns or the like as the water can be boiled off as steam while leaving the other (higher boiling) materials in the heating vessel.

This invention may be applied to any long chain aliphatic succinimide in which the number average molecular weight of the long chain hydrocarbyl group is in the range of 700 to 2,500, and preferably in the range of 900 to 2,100. The nature and methods for the production of such compounds are well known to those skilled in the art. See for example, U.S. Pat. Nos. 3,087,936, 3,178,892, 3,202,678, 3,219,666, 3,272,746, 3,254,025, 3,338,832, and 4,388,201, the disclosures of which are incorporated herein by reference. Preferred succinimides are alkyl or alkenyl succinimides of alkylene polyamines, especially mixtures including triethylene tetramine and/or tetraethylene pentamine in which the alkyl or alkenyl group has a number average molecular weight in the range of 900 to 1,800.

Suitable triazoles include benzotriazole and alkyl-substituted benzotriazoles preferably having 1 or 2 alkyl groups containing 1 to 10 carbon atoms, most preferably 1 carbon atom. Benzotriazole is available under the trade designation Cobratec 99 from Sherwin-Williams Chemical Company. A particularly suitable alkyl-substituted benzotriazole is tolyltriazole which is available from Sherwin-Williams Chemical under the trade designation Cobratec TT-100.

It will be appreciated of course that this invention is applicable to mixtures of succinimides and benzotriazoles that are normally incompatible when admixed at 25° C.

The alkoxylated amines which may be utilized in the practice of this invention are preferably primary aliphatic amines that have been ethoxylated or propoxylated. The resultant product is thus an N,N-bis(hydroxyalkyl)-N-aliphatic amine in which the aliphatic group is preferably an alkyl or alkenyl group containing from 10 to 22 carbon atoms, most preferably an alkyl or alkenyl group containing from 16 to 18 carbon atoms. N,N-bis(hydroxyethyl)-N-tallow amine is especially preferred.

Dihydrocarbylphosphites usable in the process of this invention include dialkylphosphites, dicycloalkylphosphites, diarylphosphites, diaralkylphosphites, monoalkylmonoarylphosphites, and the like. Illustrative compounds of this type include dimethylphosphite, diethylphosphite, dibutylphosphite, dioctylphosphite, dicyclohexylphosphite, diphenylphosphite, diallylphosphite, dibenzylphosphite, phenylneopentylphosphite, and the like.

Phosphonate esters which may be employed in accordance with this invention are dihydrocarbyl esters of a hydrocarbyl-phosphoric acid, which compounds may be represented by the formula $R-PO(OR)_2$ in which the R groups may be the same or different hydrocarbyl groups. Illustrative compounds of this type include: dimethyl octadecane phosphonate, dimethyl octadecene phosphonate, diethyl dodecane phosphonate, dibutyl tetradecane phosphonate, dioctyl butane phosphonate, dihexyl benzene phosphonate, diphenyl 2-ethylhexane phosphonate, diallyl cyclohexane phosphonate, and the like.

Suitable boronating agents include trimethyl borate, triethyl borate, tripropyl borate, tributyl borate, triphenyl borate, tribenzyl borate, dimethyl borate, monobutyl borate, monophenyl borate, and the like, as well as similar esters of metaboric acid, pyroboric acid, and other oxyacids of boron. Boric acid is the preferred boronating agent.

The practice and advantages of this invention are illustrated by the following examples. The long chain succinimide dispersant used in these illustrative examples was an monoalkenyl succinimide derived from a commercial mixture of alkylene polyamines. The succinimide was formed by reacting an approximately equimolar mixture of maleic anhydride and polyisobutylene having a number average molecular weight of approximately 980 and then reacting this product with a mixture of alkylene polyamines predominating in triethylene tetramine and tetraethylene pentamine, using about 0.5 mole of the amines per mole of polyisobutylene employed. Products of this general type but made with different stoichiometry in the second step are described for example in U.S. Pat. No. 3,202,678.

EXAMPLE 1

Into a reaction vessel equipped with heating and stirring means were charged 200.7 grams of the above long chain succinimide dispersant, 3.14 grams of tolyltriazole (Cobratec TT-100, supplied as a prilled material with an average diameter of 4 to 5 mm per particle). This mixture was heated in approximately 20 minutes to 0° C. at which temperature the mixture suddenly clarified. On cooling to room temperature the product remained homogeneous. In this operation no water other than that normally present in the raw materials was used.

EXAMPLE 2

In this instance the initial charge to the reaction vessel was composed of 200 grams of the succinimide dispersant, 3.13 grams of the tolyltriazole and 1.88 grams of water. This mixture was heated to 80° C. for approximately fifteen minutes whereupon it suddenly clarified and remained clear even after being cooled to room temperature.

EXAMPLE 3

In this experiment concurrent homogenation and boronation were effected by charging the reaction vessel with 255 grams of the succinimide dispersant, 10 grams of boric acid crystals, 3.5 grams of tolyltriazole, 25 grams of dibutylphosphite, and 16 grams of N,N-bis(hydroxyethyl)-N-tallow amine (ETHOMEEN T-12). The mixture was heated at 100° C. for 3 hours at which point the boric acid had all dissolved in the mixture. Then a vacuum of no more than 40 mm of mercury was applied to distill off the water and butyl alcohol formed in the reaction. The temperature was gradually raised to 11° C. to distill off the last quantity of distillate. The desired product mixture left in the reaction vessel remained homogeneous after cooling to room temperature.

EXAMPLE 4

The procedure of Example 3 was repeated using a charge composed of 255 grams of the succinimide dispersant, 10 grams of the boric acid crystals, 3 5 grams of the tolyltriazole, 16 grams of the bis(hydroxyethyl) tallow amine and 3.0 grams of water. Heating and application of vacuum as in Example 3 resulted in the formation of a product in the reaction vessel which remained homogeneous after cooling to room temperature.

The compatible additive concentrates of this invention are useful when added in conventional amounts (e.g., 0.5 to 10 percent by weight) to mineral lubricating oils. The additive combinations serve as highly effective dispersants and detergents with excellent metal deactivating and corrosion preventing properties when employed in such media. The products may also be used as additives to gasoline, diesel fuel, and home heating oils.

This invention is susceptible to considerable variation in its practice within the spirit and scope of the appended claims.

What is claimed is:

1. A process of forming a homogeneous product from a long chain succinimide in which the chain has a number average molecular weight in the range of 700 to 2,500 and a benzotriazole which at a temperature of 25° C. is normally incompatible therewith, which process comprises (a) heating at a temperature in the range of 50° to about 150° C. and for a time sufficient to achieve homogeneity, a mixture of from about 10 to about 1,000 parts by weight of the succinimide per part by weight of the benzotriazole, optionally with (i) water or (ii) an N,N-bis(hydroxyalkyl)-N-hydrocarbylamine or (iii) a dihydrocarbyl phosphite, or (iv) a dihydrocarbyl phosphonate, or any mixture of any two or any three or all four of (i), (ii), (iii) and (iv); and (b) distilling off excess water, if any.

2. A process of claim 1 wherein the benzotriazole is tolyltriazole.

3. A process of claim 1 wherein the succinimide is an alkyl or alkenyl succinimide of an alkylene polyamine in which the alkyl or alkenyl group has a number average molecular weight of 900 to 2,100.

4. A process of claim 3 wherein the succinimide is an alkyl or alkenyl succinimide of a mixture composed predominantly of triethylene tetramine and tetraethylene pentamine.

5. A process of claim 1 wherein at least a portion of the heating is conducted at a temperature of at least about 80° C.

6. A process of claim 1 wherein the benzotriazole is tolyltriazole and wherein at least a portion of the heating is conducted at a temperature of at least about 80° C.

7. A process of claim 6 wherein the succinimide in an alkyl or alkenyl succinimide of an alkylene polyamine in which the alkyl or alkenyl group has a number average molecular weight of 900 to 2,100.

8. A process of claim 1 wherein said mixture in (a) includes at least about 0.1 part by weight water per part by weight benzotriazole and excess water is distilled off in (b).

9. A process of claim 1 wherein said mixture in (a) includes at least an N,N-bis(hydroxyalkyl)-N-aliphatic amine in which the aliphatic group contains from 10 to 22 carbon atoms.

10. A process of claim 9 wherein the amine is N,N-bis-(hydroxyethyl)-N-tallow amine.

11. A process of claim 1 wherein said mixture in (a) includes at least a dihydrocarbylphosphite.

12. A process of claim 11 wherein said phosphite is a dialkylphosphite in which each alkyl group has up to 20 carbon atoms.

13. A process of claim 12 wherein said phosphite is dibutylphosphite.

14. A process of claim 1 wherein the succinimide is an alkyl or alkenyl succinimide of an alkylene polyamine in which the alkyl or alkenyl group has a number average molecular weight in the range of 900 to 2,100; wherein said mixture in (a) includes at least water and an N,N-bis(hydroxyalkyl)-N-hydrocarbylamine; and wherein excess water is distilled off in (b).

15. A process of claim 1 wherein the succinimide is an alkyl or alkenyl succinimide of an alkylene polyamine in which the alkyl or alkenyl group has a number average molecular weight in the range of 900 to 2,100; wherein said mixture in (a) includes at least water and a dihydrocarbylphosphite; and wherein excess water is distilled off in (b).

16. A process of claim 1 wherein the succinimide is an alkyl or alkenyl succinimide of an alkylene polyamine in which the alkyl or alkenyl group has a number average molecular weight in the range of 900 to 2,100; and wherein said mixture in (a) includes at least an N,N-bis(hydroxyalkyl)-N-hydrocarbylamine and a dihydrocarbylphosphite.

17. A process of claim 1 wherein the succinimide is an alkyl or alkenyl succinimide of an alkylene polyamine in which the alkyl or alkenyl group has a number average molecular weight in the range of 900 to 2,100; wherein said mixture in (a) includes at least water and an N,N-bis(hydroxyalkyl)-N-hydrocarbylamine and a dihydrocarbylphosphite; and wherein excess water is distilled off in (b).

18. A product produced by the process of claim 1.

19. A process of forming a homogeneous boronated product from a long chain succinimide in which the chain has a number average molecular weight in the range of 700 to 2,500 and a benzotriazole which at a temperature of 25° C. is normally incompatible therewith, which process comprises (a) heating at a temperature in the range of about 50° to about 150° C. and for a time sufficient to achieve boronation and homogeneity, a mixture of the succinimide, the benzotriazole, and a boronating agent in proportions in parts by weight of 0.1 to 10 parts succinimide, 0.01 to 0.1 parts benzotriazole and 0.01 to 0.3 parts boronating agent, and optionally with (i) water or (ii) an N,N-bis-(hydroxyalkyl)-N-hydrocarbylamine or (iii) a dihydrocarbonyl phosphite, or (iv) a dihydrocarbyl phosphonate, or any mixture of any two or any three or all four of (i), (ii), (iii) and (iv); and (b) distilling off excess water, if any.

20. A process of claim 19 wherein the boronating agent is boric acid and wherein at least a portion of the heating is conducted at a temperature in the range of 100° to 120° C.

21. A process of forming a homogeneous boronated product from a long chain succinimide in which the chain has a number average molecular weight in the range of 700 to 2,500 and a benzotriazole which at a temperature of 25° C. is normally incompatible therewith, which process comprises (a) heating at a temperature in the range of about 50° to about 150° C. and for a time sufficient to achieve boronation and homogeneity, a mixture of the succinimide, the benzotriazole, a boronating agent, and water or an N,N-bis(hydroxyalkyl)-N-hydrocarbylamine or both in proportions in parts by weight of 0.1 to 10 parts succinimide, 0.01 to 0.1 part benzotriazole, 0.01 to 0.3 part boronating agent, and 0.01 to 0.1 part water or 0.01 to 1 part N,N-bis(hydroxyalkyl)-N-hydrocarbyl amine or both, optionally with (i) a dihydrocarbyl phosphite, or (ii) a dihydrocarbyl phosphonate, or any mixture of (i) and (ii); and (b) distilling off excess water.

22. A process of claim 21 wherein the benzotriazole is tolyltriazole.

23. A process of claim 21 wherein the succinimide in an alkyl or alkenyl succinimide of an alkylene polyamine in which the alkyl or alkenyl group has a number average molecular weight of 900 to 2,100.

24. A process of claim 23 wherein the succinimide is an alkyl or alkenyl succinimide of a mixture composed predominantly of triethylene tetramine an tetraethylene pentamine.

25. A process of claim 21 wherein at least a portion of the heating is conducted at a temperature in the range of about 100° to about 120° C.

26. A process of claim 21 wherein the boronating agent is boric acid.

27. A process of claim 21 wherein the benzotriazole is tolyltriazole and wherein at least a portion of the heating is conducted at a temperature in the range of about 100° to about 120° C.

28. A process of claim 27 wherein the succinimide in an alkyl or alkenyl succinimide of an alkylene polyamine in which the alkyl or alkenyl group has a number average molecular weight of 900 to 2,100.

29. A process of claim 21 wherein said mixture in (a) includes at least an N,N-bis(hydroxyalkyl)-N-aliphatic amine in which the aliphatic group contains from 10 to 22 carbon atoms.

30. A process of claim 29 wherein the amine is N,N-bis-(hydroxyethyl)-N-tallow amine.

31. A process of claim 21 wherein said mixture in (a) includes 0.1 to 1 part by weight a dihydrocarbylphosphite.

32. A process of claim 31 wherein said phosphite is a dialkylphosphite in which each alkyl group has up to 20 carbon atoms.

33. A process of claim 32 wherein said phosphite is dibutylphosphite.

34. A process of claim 21 wherein the succinimide is an alkyl or alkenyl succinimide of an alkylene polyamine in which the alkyl or alkenyl group has a number average molecular weight in the range of 900 to 2,100; and wherein said mixture in (a) includes at least an N,N-bis(hydroxyalkyl)-N-hydrocarbylamine and a dihydrocarbylphosphite.

35. A process of claim 21 wherein the succinimide is an alkyl or alkenyl succinimide of a alkylene polyamine in which the alkyl or alkenyl group has a number average molecular weight in the range of 900 to 2,100; and wherein said mixture in (a) includes at least an N,N-bis(hydroxyalkyl)N-hydrocarbylamine and 0.01 to 0.3 parts by weight of a dihydrocarbyl phosphonate.

36. A process of claim 21 wherein the succinimide is an alkyl or alkenyl succinimide of an alkylene polyamine in which the alkyl or alkenyl group has a number average molecular weight in the range of 900 to 2,100; and wherein said mixture in (a) includes at least an N,N-bis(hydroxyalkyl)-N-hydrocarbylamine, a dihydrocarbylphosphite and a dihydrocarbyl phosphonate.

37. A process of claim 21 wherein said mixture consists essentially of the succinimide, the benzotriazole, a boronating agent, and water; wherein the succinimide in an alkyl or alkenyl succinimide of an alkylene polyamine in which the alkyl or alkenyl group has a number average molecular weight of 900 to 2,100; wherein the benzotriazole is tolyltriazole; wherein the boronating agent is boric acid; and wherein at least a portion of the heating is conducted at a temperature in the range of about 100° to 120° C.

38. A process of claim 21 wherein said mixture consists essentially of the succinimide, the benzotriazole, a boronating agent, and an N,N-bis(hydroxyethyl)-N-hydrocarbylamine in which the hydrocarbyl group is an alkyl or alkenyl group containing from 10 to 22 carbon atoms; wherein the succinimide in an alkyl or alkenyl succinimide of an alkylene polyamine in which the alkyl or alkenyl group has a number average molecular weight of 900 to 2,100; wherein the benzotriazole is tolyltriazole; wherein the boronating agent is boric acid; and wherein at least a portion of the heating is conducted at a temperature in the range of about 100° to 120° C.

39. A product produced by the process of claim 19.

* * * * *